United States Patent [19]

Sasaki et al.

[11] Patent Number: 4,971,595

[45] Date of Patent: * Nov. 20, 1990

[54] SLIDING UNIVERSAL JOINT HAVING A HOLDER INCLINATION RESTRICTION FLANGE AND INDEPENDENT RAILS

[75] Inventors: Akira Sasaki; Seiji Easki; Yasushi Hashimoto; Shigeo Kurita, all of Wako, Japan

[73] Assignee: Honda Giken Kogyo Kabushiki Kaisha, Tokyo, Japan

[ * ] Notice: The portion of the term of this patent subsequent to Jan. 2, 2007 has been disclaimed.

[21] Appl. No.: 212,536

[22] Filed: Jun. 28, 1988

[30] Foreign Application Priority Data

Jul. 1, 1987 [JP] Japan .................. 62-101632[U]
Jul. 1, 1987 [JP] Japan .................. 62-101635[U]

[51] Int. Cl.$^5$ ........................................ F16D 3/205
[52] U.S. Cl. ........................... 464/111; 464/123; 464/905
[58] Field of Search ............... 464/111, 123, 132, 905

[56] References Cited

U.S. PATENT DOCUMENTS

| | | |
|---|---|---|
| 3,792,596 | 2/1974 | Orain .................. 464/111 |
| 4,192,154 | 3/1980 | Nakamura et al. ........ 464/111 |
| 4,578,048 | 3/1986 | Hirai et al. ............ 464/111 |

FOREIGN PATENT DOCUMENTS

| | | |
|---|---|---|
| 56-47413 | 11/1981 | Japan . |
| 57-13211 | 3/1982 | Japan . |
| 62-25098 | 2/1987 | Japan . |

Primary Examiner—Daniel P. Stodola
Attorney, Agent, or Firm—Armstrong, Nikaido Marmelstein, Kubovcik & Murray

[57] ABSTRACT

A restriction flange is independently formed and then fitted on one end of each cylindrical holder in a sliding universal joint and abuts a rail portion surface of the transmitting groove to prevent inclination of the holder. The rail portion can also be formed independently of the outer member and then fixed thereto by bolting, welding or caulking.

4 Claims, 5 Drawing Sheets

SLIDING UNIVERSAL JOINT HAVING A HOLDER INCLINATION RESTRICTION FLANGE AND INDEPENDENT RAILS

BACKGROUND OF THE INVENTION

The present invention relates to a sliding universal joint to be mounted at a bending portion of a bendable drive axle in an automobile, for example. More particularly, the invention is directed to an improvement in a joint including a cylindrical outer member connected to one transmitting shaft and having an inner periphery formed with plurality of transmitting grooves arranged circumferentially equally spaced from each other and extending axially, an inner member connected to another transmitting shaft and having a plurality of trunnions radially extending to project into the transmitting grooves, an inner roller slidably engaged with an outer periphery of each trunnion, a holder relatively oscillatably engaging with an outer periphery of each inner roller, and an outer roller rotatably engaging with an outer periphery of each holder and engaged with the respective transmitting groove.

This type of universal joint is known as disclosed in Japanese Patent Publication No. 57-13211.

In the conventional joint, when both transmitting shafts are bent relative to each other during transmission of torque, the outer roller is reciprocatingly rolled in the transmitting groove permitting inclination of the trunnion. The inclination of the trunnion follows the inclination of the outer roller, causing an increase in rolling resistance of the outer roller and thus, generating vibration.

The present invention has been achieved to solve the above problem, and it is an object of the present invention to provide a sliding universal joint in which inclination of the outer roller is prevented even when the trunnion is inclined and the outer roller is allowed to reciprocatingly roll in the transmitting groove with a proper rolling condition maintained, and which may be easily manufactured.

According to the present invention, there is provided in a sliding universal joint the improvement comprising a restriction plate formed independently of the holder and fixed to a side edge portion of the holder at an opening of the transmitting groove, and a rail portion provided on the outer member, the rail portion abutting against the restriction plate and restricting inclination of the holder.

When this arrangement, the restriction plate of the holder abuts against the rail portion of the outer member. Accordingly, even when the trunnion is inclined, the holder is suppressed from being inclined. As a result, the outer roller supported on the holder is prevented from being inclined, thereby allowing a smooth reciprocal rolling motion of the outer roller in the transmitting groove.

Further, as the restriction plate is manufactured independently of the holder, it is easily formed in a rectangular shape, for example, suitable for restriction of inclination of the holder.

BRIEF EXPLANATION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
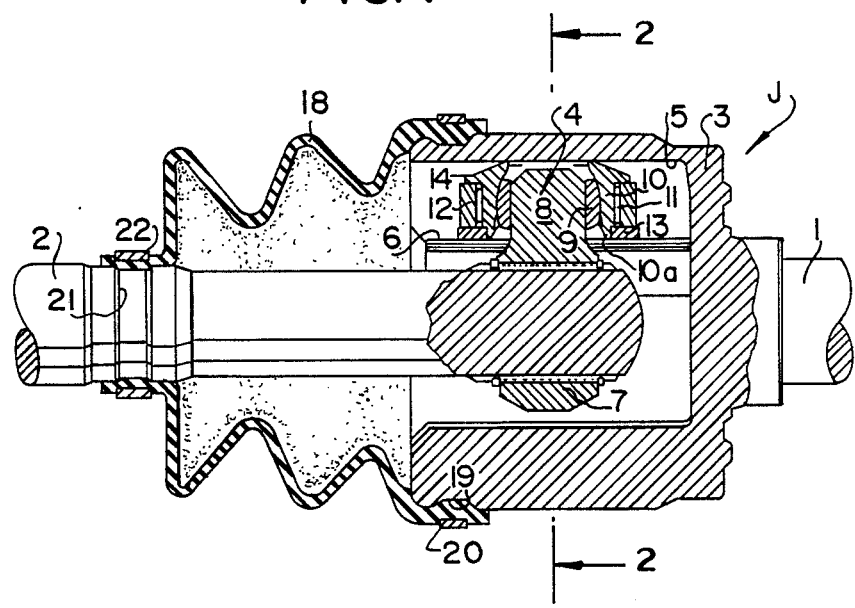
FIG. 1 is a vertical sectional view of the first.‘ preferred embodiment of the sliding universal joint according to the present invention.
Figure 2:
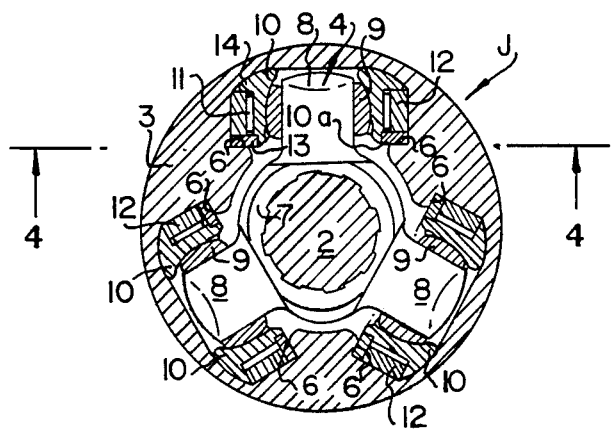
FIG. 2 is a cross section taken along the line II—II in FIG. 1.

There will now be described preferred embodiments of the present invention with reference to the drawings. Referring first to FIGS. 1 and 2, two transmitting shafts 1 and 2 are connected to each other through a sliding universal joint J of the present invention. The joint J primarily comprises a cylindrical outer member 3 integrally formed with an end portion of the transmitting shaft 1 which outer member 3 is open at one end thereof, and an inner member 4 fixed to an end portion of the transmitting shaft 2 and received in the outer member 3. The outer member 3 is formed on its inner peripheral surface with three axially extending transmitting grooves 5 circumferentially equally spaced from each other. Each groove 5 is provided with a pair of rail portions 6 inwardly projecting from opposite inner side edges of the groove 5 toward an opening of the groove 5.

The inner member 4 fixed to the transmitting shaft 2 is formed with a boss 7. The boss 7 is integrally formed on its outer peripheral surface with three trunnions 8 projecting into the three transmitting grooves 5.

A spherical inner roller 9 is slidably engaged with an outer periphery of each trunnion 8 in such a manner that a center of the inner roller 9 lies on an axis of the trunnion 8. A holder 10 is relatively oscillatably engaged with the spherical outer periphery of the inner roller 9. A cylindrical outer roller 12 is rotatably engaged through a needle bearing II on the outer periphery of the holder 10, and is rollingly engaged with the inner surface of the transmitting groove 5.

An outer end of the holder 10 slidably abuts against a bottom surface of the transmitting groove 5, while an inner end of the holder 10 is provided with a restriction plate 13 slidably abutting against the inside surfaces of the rail portion 6.

Figure 3:
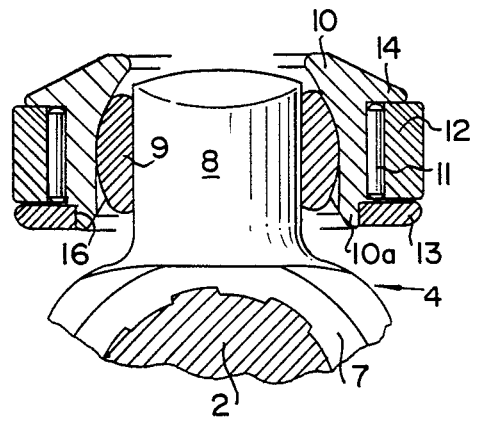
FIG. 3 is an enlarged view of the essential part in FIG. 2.

As shown in FIG. 3, the restriction plate 13 is manufactured independently of the holder 10. The restriction plate 13 has a central circular opening 13a for mounting the holder 10 thereto. The restriction plate 13 is fixed to the holder 10 by press-fitting into the circular opening 13a a short shaft portion 10a projecting from the inner end of the holder 10. Such press-fitting may be replaced by any fixing means such as welding or bolting.

Figure 4:
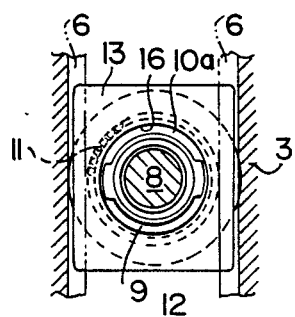
FIG. 4 is a cross section taken along the line IV—IV in FIG. 2.

As shown in FIG. 4, the restriction plate 13 has a rectangular shape such that at least one side of the plate extending across the width of the transmitting groove is slightly smaller than an outer diameter of the outer roller 12, so that the outer roller 12 is not hindered from rolling. Thus, the plate 13 may be reciprocated in the transmitting groove 5 without being rotated.

Further, the holder 10 is integrally formed with a flange 14 for restricting an axial movement of the outer roller 12 in cooperation with the restriction plate 13.

Referring back to FIG. 1, a flexible boot 18 is provided between the outer member 3 and the transmitting shaft 2 to cover the front opening of the outer member 3. A rear end of the flexible boot 18 is engaged with an outer circumferential groove 19 of the outer member 3, and is tightened by a band 20. A front end of the flexible boot 18 is engaged with an outer circumferential groove 21 of the transmitting shaft 2, and is tightened by a band 22.

In operation, when torque is applied to the transmitting shaft 1, for example, the torque is transmitted from the outer member 3 to the inner member 4, that is, from one side surface of the transmitting groove 5 through the outer roller 12, the holder 10 and the inner roller 9 to the trunnion 8 and the boss 7, and is finally transmitting to the transmitting shaft 2.

During such transmission of torque, when the transmitting shafts 1 and 2 are bent relative to each other in such a manner that the axes of the transmitting shafts 1 and 2 obliquely intersect with each other, the inner roller 9 is slid on the trunnion 8 permitting inclination of the trunnion 8, while the outer roller 12 is reciprocatingly rolled on one side surface of the transmitting groove 5. At this time, since the restriction plate 13 is in abutment against the rail portions 6, the holder 1 0 is suppressed from being inclined in the transmitting groove 5. Accordingly, the outer roller 12 supported on the holder 10 is prevented from being inclined, thereby allowing a smooth rolling motion of the outer roller 12 in the transmitting groove 5.

Further, also in the case that both the transmitting shafts 1 and 2 are axially displaced, the outer roller 12 is not inclined, but can be smoothly rolled on the opposite side surfaces of the transmitting groove 5.

While the restriction plate 13 has a rectangular shape optimum for the restriction of inclination of the holder 10, the restriction plate 13 is manufactured independently of the holder 10 before the former is fixed to the latter. Thus, the restriction plate 13 may be easily manufactured with a high yield.

As described above, the restriction plate formed independently of the holder is fixed to a side edge portion of the holder at an opening of the transmitting groove, and the rail portion abutting against the restriction plate and restricting inclination of the holder is provided on the outer member. Accordingly, even when the trunnion is inclined, the holder is suppressed from being inclined, and the outer roller is maintained always in a proper rolling condition by the abutment of the restriction plate against the rail portions, thereby allowing a smooth reciprocal rolling motion of the outer roller in the transmitting groove. As a result, it is possible to prevent a power loss and vibration due to the inclination of the outer roller.

Moreover, as the restriction plate is formed independently of the holder, the plate may be easily manufactured into a rectangular shape, for example, suitable for the restriction of inclination of the holder.

Figure 5:
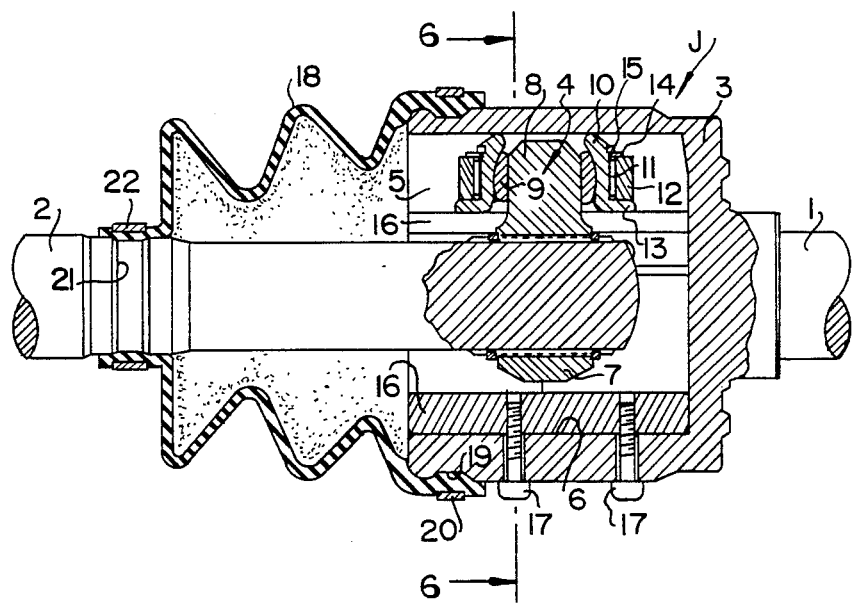
FIG. 5 is a vertical sectional view of the second preferred embodiment of the sliding universal joint according to the present invention.
Figure 6:
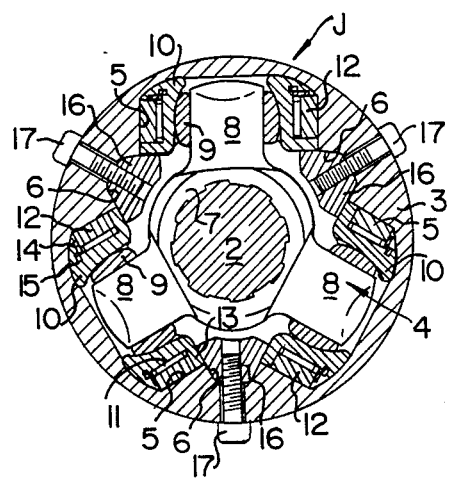
FIG. 6 is a cross section taken along the line VI—VI in FIG. 5.

Referring next to FIGS. 5, and 6 which show a second preferred embodiment of the present invention, three rail members 16 are fixed to the outer member 3 by bolts 17. The outer member 3 and the rail members 16 are independently manufactured by forging or the like before they are assembled with each other. Accordingly, even when the assembly of the outer member 3 and the rail members 16 has a complicated inner surface shape, the assembly may be easily obtained.

Figure 7:
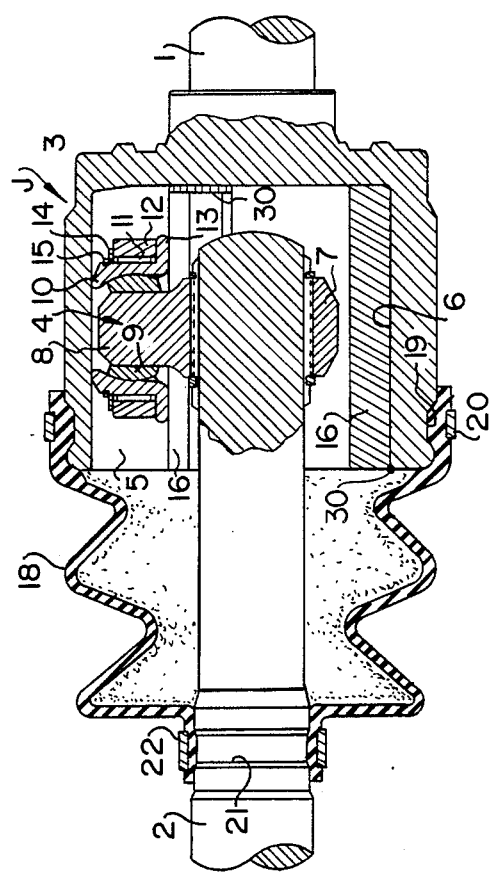
FIG. 7 is a vertical sectional view of the third preferred embodiment.

Referring to FIG. 7 which shows a third preferred embodiment of the present invention, three rail members 16 are fixed to the outer member 3 by welding. That is, opposite ends of the each rail member 16 are welded at 30 to a closed inner end wall and an open end of the outer member 3. The other construction is similar to the construction of the second preferred embodiment, and the corresponding parts are designated by the same reference numerals.

Figure 8:
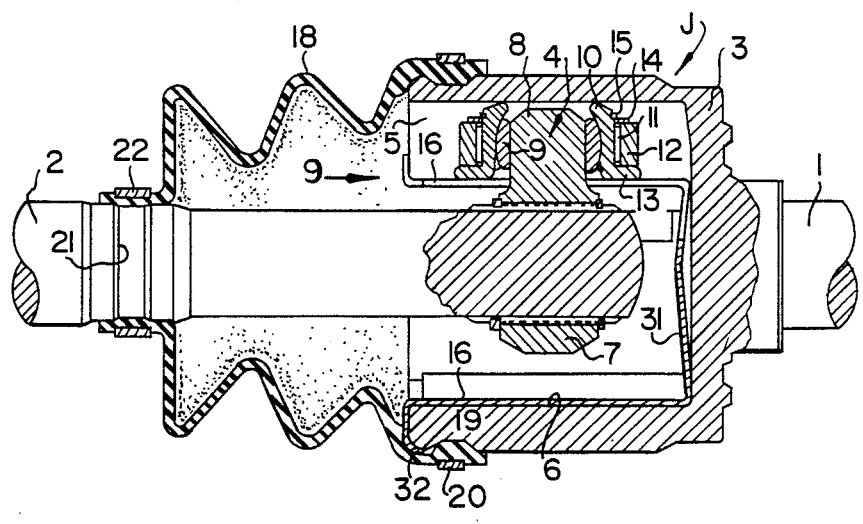
FIG. 8 is a vertical sectional view of the fourth preferred embodiment.
Figure 9:
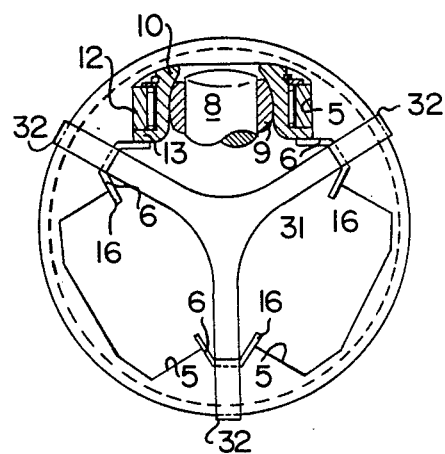
FIG. 9 is a view taken from the arrow IX in FIG. 8.

Referring to FIGS. 8 and 9 which shows a fourth preferred embodiment of the present invention, three rail members 16 are fixed to the outer member 3 by caulking. That is, each rail member 16 is formed by pressing a sheet steel into a sectional cup-shaped configuration. These rail members 16 are connected at their ends to each other by a Y-shaped plate 31, and each rail member 16 is connected at the other end to a bracket 32 radially outwardly bent. Each rail member 16 is enlarged with a mount groove 3a of the outer member 3, and the Y-shaped plate 31 is positioned to abut against the closed inner wall of the outer member 3. Then, each bracket 32 is caulked to engage with the outer peripheral groove 19 of the outer member 3, thus fixing the rail members 16 to the outer member 3. The other construction is similar to the construction of the second preferred embodiment, and the corresponding parts are designated by the same reference numerals.

In the second to the fourth preferred embodiments as mentioned above, the holder 10 is shown as being integrally formed with a restriction flange 13 at the opening of the transmitting groove. Alternatively, the restriction flange 13 can be formed independently as in the first embodiment.

As described above, the restriction flange is provided at the inner end of the holder at the opening of the transmitting groove, and the rail members abutting against the restriction flange and restricting inclination of the holder is fixed to the inner member by the fixing means such as bolting, welding or caulking. With this arrangement, even when the trunnion is inclined, the outer roller is maintained always in a proper rolling condition by the abutment of the restriction flange against the rail members, and is smoothly reciprocatingly rolled in the transmitting groove. Accordingly, it is possible to prevent a power loss and vibration due to the inclination of the outer roller.

Furthermore, as the outer member and the rail members are independently manufactured, the assembly of the outer member and the rail members having a complicated inside surface may be easily obtained.

It is readily apparent that the above-described meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is to be claimed is:

1. In a sliding universal joint including a cylindrical outer member connected to one transmitting shaft and having an inner periphery formed with a plurality of transmitting grooves arranged circumferentially equally spaced from each other and extending axially, an inner member connected to another transmitting shaft and having a plurality of trunnions radially extending to project into said transmitting grooves, an inner roller slidably engaged with an outer periphery of each trunnion, a holder relatively oscillatably engaging with an outer periphery of each said inner roller, and an outer roller rotatably engaging with an outer periphery of each said holder and engaged with the respective transmitting groove; the improvement comprising a rectangular restriction plate formed independently of said holder and fixed to a side edge portion of said holder at an opening of said transmitting groove, and a rail portion provided on said outer member defining a side wall of said transmitting groove, said restriction plate being reciprocable in said transmitting groove without rotation and said rail portion abutting against said restriction plate and restricting inclination of said holder.

2. The sliding universal joint as defined in claim 1, wherein said rail portion is bolted to said outer member.

3. The sliding universal joint as defined in claim 1, wherein said rail portion is welded to said outer member.

4. The sliding universal joint as defined in claim 1, wherein said rail portion is caulked to said outer member.

* * * * *